A. E. RICH.
HOSE-COUPLING.
No. 189,059.  Patented April 3, 1877.
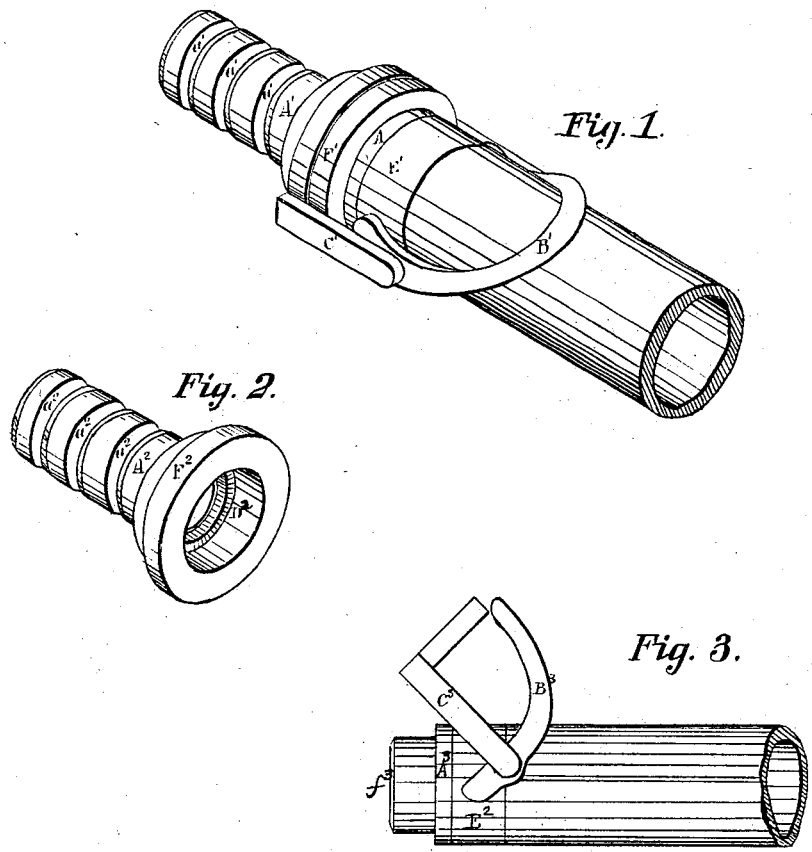

UNITED STATES PATENT OFFICE.

AUGUSTUS E. RICH, OF FALL RIVER, MASSACHUSETTS, ASSIGNOR OF ONE-THIRD OF HIS RIGHT TO JAMES H. CRITTENDEN, OF SAME PLACE.

IMPROVEMENT IN HOSE-COUPLINGS.

Specification forming part of Letters Patent No. 189,059, dated April 3, 1877; application filed December 26, 1876.

*To all whom it may concern:*

Be it known that I, AUGUSTUS E. RICH, of Fall River, in the county of Bristol and State of Massachusetts, have invented a new and useful Improvement in Hose-Coupling, which improvement is fully set forth in the following specifications and accompanying drawings, in which—

Figure 1 is a perspective view of a hose-coupling with my invention attached to it. Figs. 2 and 3 are the two parts of the coupling separated.

The object of my invention is to produce a hose or pipe coupling for connecting water, steam, gas, or air pipes, which may be quickly and accurately connected or disconnected without twisting the hose or pipe, without a screw or its equivalent.

My invention consists in a loose ring or band affixed around the male part of the coupling, and in a lever eccentrically hinged to it, carrying a pivoted yoke, which reaches the female part of the coupling and fastens to it.

In the drawings, $A^1$ A is the hose or pipe coupling. $A^1$ is the female, A the male, part. The female part $A^1$ has the hose removed from it, showing the corrugations $a'$ $a'$ $a'$ for securing hose to the cylinder of the coupling. The male part A has the hose affixed to the cylinder of the coupling by corrugations. $B^1$ is a lever $C^1$ is a yoke. $E'$ is a loose ring or band affixed around the male part of the coupling. $F^1$ is a collar, cast with $A^1$. In Figs. 2 and 3 $A^2$ is the female, and $A^3$ is the male, part of the coupling. $B^3$ is the eccentrically-hinged lever, which carries the yoke $C^3$, which is pivoted to it. This yoke reaches across, and fastens to, the female part of the coupling, as shown in Fig. 1. The female part of the coupling is made so that the male part will enter inside of it and form a joint. Between the two parts, and in the female part is placed a leather or rubber ring packing, $D^2$. The end of the male coupling $f^3$ is beveled, to allow the elasticity of the packing to assist the eccentrically-hinged lever $B^1$, when operated, to pass the center. The pressure of water, steam, gas, or air is on the inside edge of the packing-ring, and will therefore keep the joint firm and perfectly tight. There may be a projection at $B^1$, under which the finger may be inserted to raise the lever.

The ring or band $E'$ affixed around the male part of the coupling, to which is attached the eccentrically-hinged lever $B^3$, is preferably made loose, and the collar $F'$ on the female part of the coupling extends entirely around the coupling, so as to allow the two parts to couple together without having to twist the hose or pipe to get the pivoted yoke in place.

Operation: Put the two parts of the coupling together, turn down the pivoted yoke over the flange on the female part of the coupling, and press down the eccentrically-hinged lever onto the hose or pipe, which will draw the two parts of the coupling together. The pivoted yoke, drawing from below the center of the eccentrically-hinged lever, will hold firmly together the two parts of the coupling. When it is desired to uncouple the hose or pipe, raise the eccentrically-hinged lever from the hose or pipe, which will loosen the pivoted yoke, when it may be slipped off the flange of the female part of the coupling, and the two parts of the coupling separated.

What I claim as my invention, and desire to secure by Letters Patent, is—

1. The eccentrically-hinged lever $B^1$, hinged to loose collar $E'$, and carrying pivoted yoke $C^1$, as specified.

2. In combination, couplings $A^1$ A, collar $E'$, packing $D^2$, with lever $B^1$ and yoke $C^1$, as described, for the purpose specified.

AUGUSTUS E. RICH.

Witnesses:
L. J. DRAKE,
JOSIAH DAY, M. D.